(12) United States Patent
Johnson

(10) Patent No.: US 10,737,719 B2
(45) Date of Patent: Aug. 11, 2020

(54) STEERABLE KNUCKLE

(71) Applicant: Deere & Company, Moline, IL (US)

(72) Inventor: Bruce Johnson, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 107 days.

(21) Appl. No.: 15/800,225

(22) Filed: Nov. 1, 2017

(65) Prior Publication Data

US 2019/0126980 A1 May 2, 2019

(51) Int. Cl.
| | | |
|---|---|---|
| B62D 7/18 | (2006.01) | |
| B62D 55/065 | (2006.01) | |
| B62D 11/20 | (2006.01) | |

(52) U.S. Cl.
CPC .............. *B62D 7/18* (2013.01); *B62D 11/20* (2013.01); *B62D 55/065* (2013.01)

(58) Field of Classification Search
CPC .. B62D 55/10; B62D 55/065; B62D 55/0655; B62D 55/084; B62D 11/02; B62D 11/20; B62D 11/22; B62D 11/24
See application file for complete search history.

(56) References Cited

U.S. PATENT DOCUMENTS

| | | | | |
|---|---|---|---|---|
| 3,379,455 | A * | 4/1968 | Dahlstrom | B60G 3/20 280/89 |
| 6,176,334 | B1 | 1/2001 | Lorenzen | |
| 6,401,847 | B1 * | 6/2002 | Lykken | B62D 55/30 180/9.1 |
| 6,402,169 | B1 | 6/2002 | Schafer et al. | |
| 7,111,697 | B2 * | 9/2006 | Brazier | A01G 25/09 180/9.1 |
| 8,083,242 | B2 * | 12/2011 | Brazier | B60G 21/04 180/9.1 |
| 8,430,188 | B2 | 4/2013 | Hansen | |
| 9,193,383 | B2 | 11/2015 | Pare et al. | |

(Continued)

OTHER PUBLICATIONS

German Search Report issued in counterpart application No. 102018218716.9 dated Sep. 13, 2019. (12 pages).

(Continued)

*Primary Examiner* — Jacob D Knutson
*Assistant Examiner* — Harold Eric Pahlck, III
(74) *Attorney, Agent, or Firm* — Taft Stettinius & Hollister LLP; Stephen F. Rost

(57) ABSTRACT

A steerable knuckle, and an axle and track drive assembly including the knuckle, is disclosed. A driveshaft rotatable about a rotational axis extends through the knuckle and is coupled to a hub. The knuckle pivots about a steering axis generally perpendicular to the rotational axis. The track drive includes a drive wheel, a drive frame, rollers, and a track. Rotation of the driveshaft about the rotational axis rotates the hub and drive wheel which rotates the track about the drive wheel and rollers. Rotation of the knuckle about the steering axis turns the track drive. The knuckle can include a hollow spindle, one or more undercarriage support arm(s) for connecting the track drive frame, steering stops, and king pin, steering cylinder, and tie rod connections. The knuckle can be a single integrated piece. The undercarriage support arm(s) can include track frame mounts that can be generally horizontal or vertical.

17 Claims, 17 Drawing Sheets

(56) References Cited

U.S. PATENT DOCUMENTS

| | | | |
|---|---|---|---|
| 9,303,692 B2* | 4/2016 | Lubben | F16C 33/6681 |
| 9,434,426 B2* | 9/2016 | Nagorcka | B62D 55/14 |
| 9,505,432 B2* | 11/2016 | Pare | B62D 7/18 |
| 9,586,635 B2* | 3/2017 | Sewell | B62D 55/12 |
| 9,663,918 B2* | 5/2017 | Vik | E02F 9/02 |
| 10,197,152 B2* | 2/2019 | Volkmer | B60K 17/046 |
| 2001/0025732 A1 | 10/2001 | Lykken et al. | |
| 2010/0139994 A1* | 6/2010 | Hansen | B62D 55/04 |
| | | | 180/9.26 |
| 2013/0161918 A1 | 6/2013 | Pare et al. | |
| 2014/0069730 A1 | 3/2014 | Lafreniere et al. | |
| 2015/0197279 A1 | 7/2015 | Pare et al. | |
| 2015/0321709 A1 | 11/2015 | Sewell | |
| 2018/0118262 A1* | 5/2018 | Vik | B62D 11/20 |
| 2019/0126979 A1* | 5/2019 | Johnson | B62D 11/20 |
| 2019/0270489 A1* | 9/2019 | Heimbuch | B62D 55/065 |
| 2019/0308677 A1* | 10/2019 | Murfey | B62D 55/065 |

OTHER PUBLICATIONS

German Search Report issued in counterpart application No. 102018218680.4 dated Sep. 13, 2019. (14 pages).

* cited by examiner

STEERABLE KNUCKLE

FIELD OF THE DISCLOSURE

The present disclosure relates to machinery with a track drive, and more particularly to a steerable knuckle on a powered axle for use with tracks.

BACKGROUND

To improve the performance of various types of machinery, for example tractors, they can be provided with front wheel drive. While the front wheels and tires are typically smaller than the rear, by driving both the front and rear wheels, tractive efficiency is improved. A mechanical front wheel drive requires a front drive axle with more components compared to a front axle without mechanical front wheel drive. Efforts to further improve tractive efficiency have also included axles with dual wheels on each side as well as axles with tracks on each side.

Many different steerable knuckle designs have been used on machinery with wheel drives and track drives. For wheel drives, the spindle on the knuckle supports the weight of the vehicle through the wheel and allows rotation of the wheel. Going from wheel drive to track drive on a steerable axle can be a challenge. With tracks, the drive wheel is separate from the track undercarriage. The track undercarriage supports the weight of the vehicle, and the drive wheel propels the track and the vehicle. The challenge can be getting the structural support from the undercarriage of the vehicle through the steerable knuckle. One solution has been to use an external bearing support that connects the drive wheel to the undercarriage and to support the weight of the vehicle through the external bearing support. However, that solution requires an extra bearing support and extra hardware to mate the external bearing support to the axle of the vehicle and may require external oscillation stops to prevent the track undercarriage from pivoting too far forward or backward while traveling over rough terrain.

It may be desirable to have a steerable knuckle that is a one-piece integrated knuckle solution, and/or that includes a spindle for power transmission to a drive wheel of a track drive, and/or that has structural support to the undercarriage of the vehicle.

SUMMARY

A steerable knuckle, as well as an axle and track drive assembly that includes a steerable knuckle, is disclosed for a vehicle that is powered and steerable. The axle assembly includes the steerable knuckle, a driveshaft, and a hub. The driveshaft is rotatable in the forward and reverse directions about a rotational axis. The steerable knuckle is pivotable about a steering axis that is generally perpendicular to the rotational axis, and the driveshaft extends through the knuckle. The axle assembly can also include a structural axle housing, where the structural axle housing is coupled to the knuckle and the driveshaft extends through the axle housing. The hub is mechanically coupled to the driveshaft. The track drive assembly includes a drive wheel coupled to the hub, a track drive frame coupled to the steerable knuckle, a plurality of rollers coupled to the drive frame, and a track connected to the drive wheel and the plurality of rollers. Rotation of the driveshaft of the axle about the rotational axis rotates the hub and drive wheel which rotates the track about the drive wheel and the plurality of rollers. Rotation of the steerable knuckle about the steering axis turns the track drive frame.

The steerable knuckle can include a hollow spindle, where the driveshaft extends through the hollow spindle. The steerable knuckle can include one or more undercarriage support arm(s), where the track drive frame is connected to the one or more undercarriage support arm(s). The one or more undercarriage support arm(s) can have a plurality of track frame mounts, where the track drive frame is connected to the one or more undercarriage support arm(s) at the plurality of track frame mounts. The plurality of track frame mounts can include inboard and outboard track frame mounts on each of the one or more undercarriage support arm(s). Each outboard track frame mount can be generally horizontal, so that fasteners can be installed generally vertically at the outboard track frame mount of the undercarriage support arm to connect the track drive frame to that undercarriage support arm. Each outboard track frame mount can be generally vertical, so that fasteners can be installed generally horizontally at the outboard track frame mount of the undercarriage support arm to connect the track drive frame to that undercarriage support arm. The steerable knuckle can include a king pin connection, the knuckle can be coupled to an axle housing at the king pin connection, and the steering axis passes through the knuckle at the king pin connection. The kingpin connection can include an upper king pin connection and a lower king pin connection, where the steering axis passes through the upper and lower king pin connections. The steerable knuckle can include a steering cylinder connection, where a steering cylinder connected at the steering cylinder connection can be used to pivot the knuckle about the steering axis. The steerable knuckle can include a tie rod connection for connection of a tie rod of the vehicle, where the tie rod can control the orientation of corresponding left and right knuckles on opposite sides of the axle assembly, so that they steer in the same general direction. The steerable knuckle can include a steering stop, where the steering stop limits how far the knuckle can pivot about the steering axis. The steerable knuckle can be a single integrated piece that includes the hollow spindle, the undercarriage support arm(s), the king pin connection, the steering cylinder connection, the tie rod connection and the steering stop.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
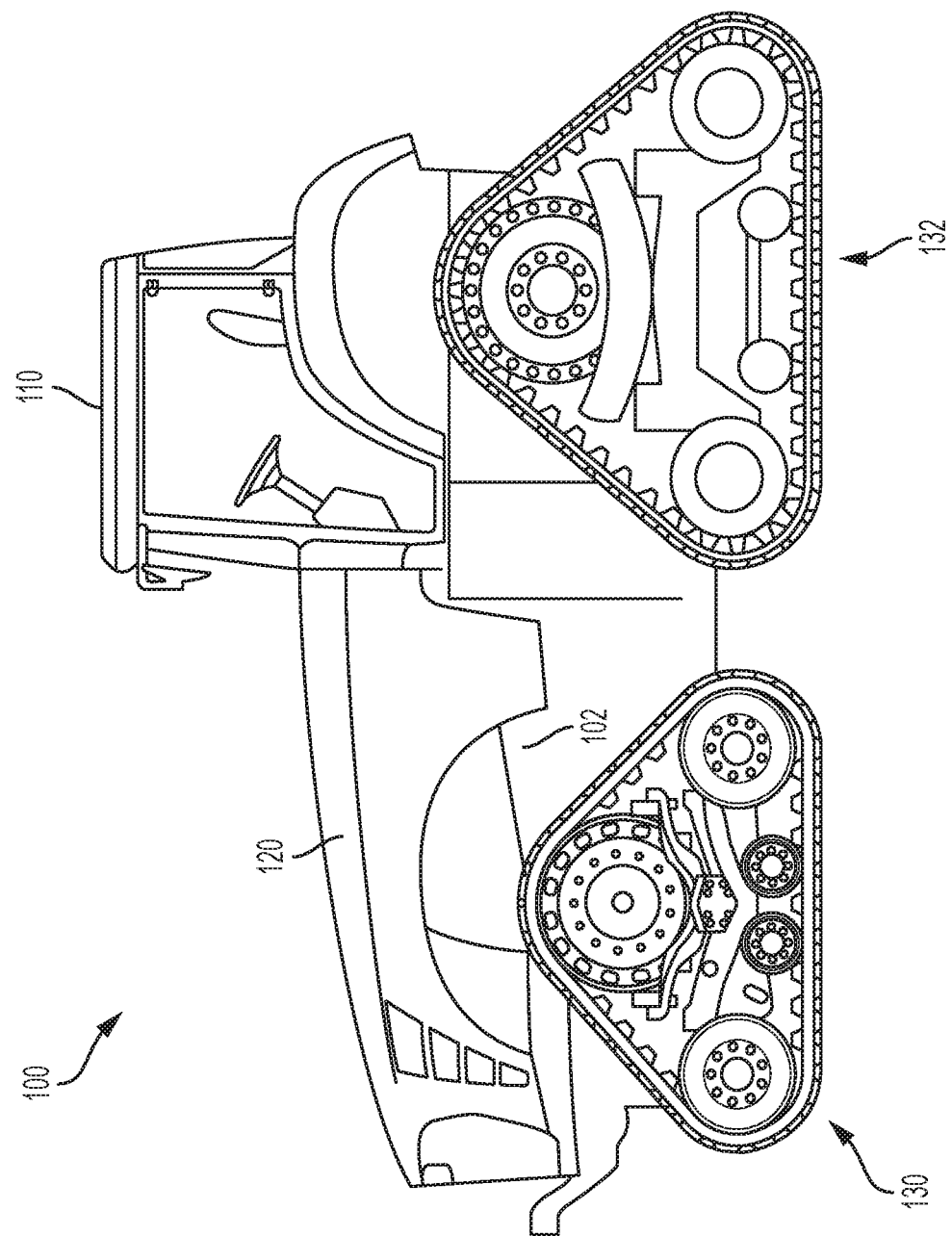
FIG. 1 illustrates an exemplary vehicle with track drives.

FIG. 1 illustrates an exemplary track drive vehicle 100, in this example a tractor, including a tractor frame 102, an operator cab 110, an engine compartment that holds an engine 120, front track drive assemblies 130 and rear track drive assemblies 132. FIG. 1 only shows the left side of the vehicle 100 with one front track drive assembly 130 and one rear track drive assembly 132; the right side of the vehicle 100 also includes one front track drive assembly 130 and one rear track drive assembly 132. The tractor frame 102 supports the operator cab 110 and engine 120. The front and rear track drive assemblies 130, 132 support the tractor frame 102 above the ground, and provide propelling force to the vehicle 100. At least the front track drive assemblies 130 can be steerable to steer the vehicle 100. Alternatively, the front and/or rear track drive assemblies 130, 132 can be steerable to steer the vehicle 100. The operator cab 110 provides the operator with a clear view of the area being worked by the vehicle 100. The operator cab 110 includes controls for the operator to control the engine 120 and the track drive assemblies 130, 132.

Figure 2:
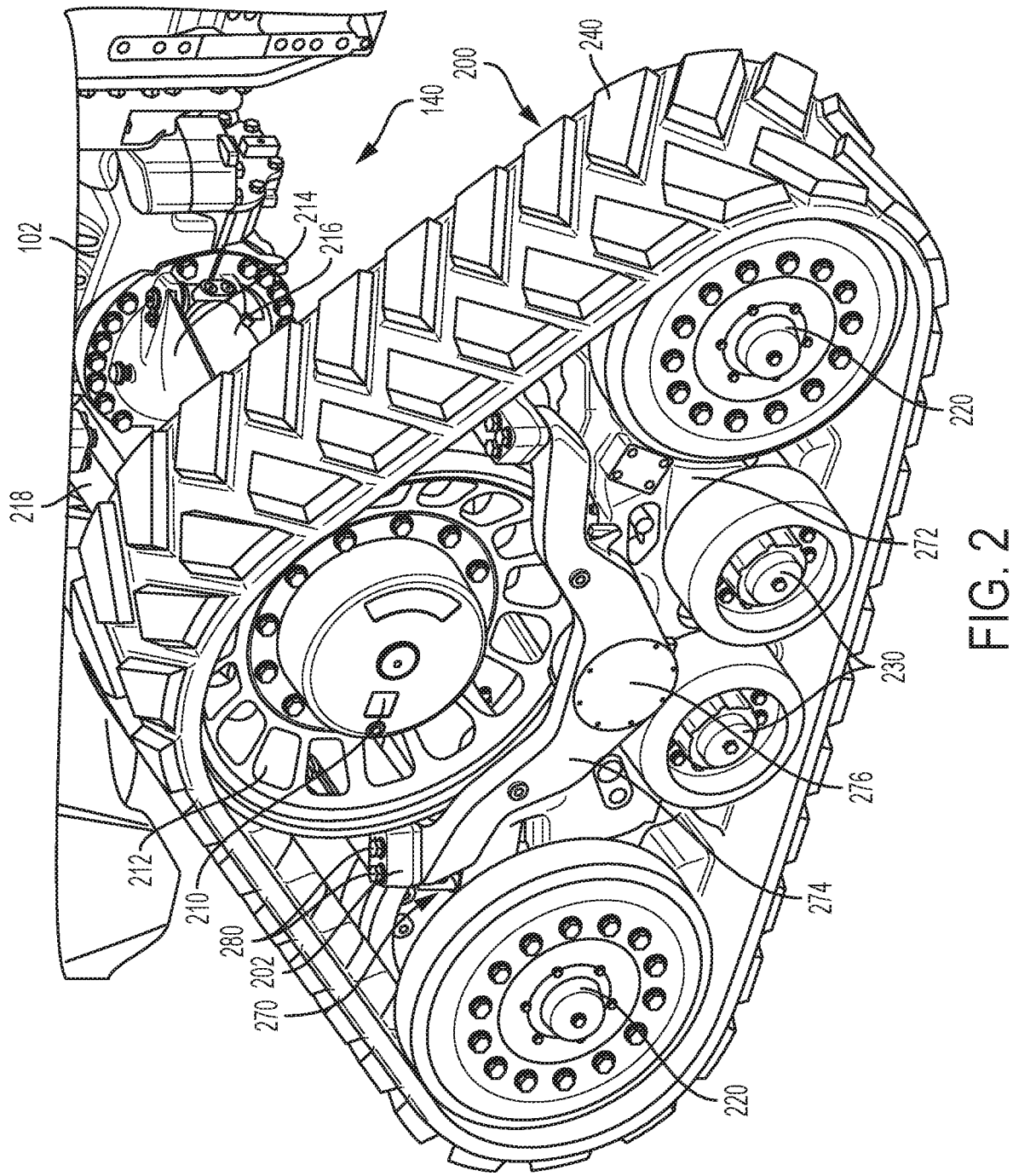
FIG. 2 illustrates an angled outside view of a first exemplary track drive assembly attached to a first exemplary axle assembly.
Figure 3:
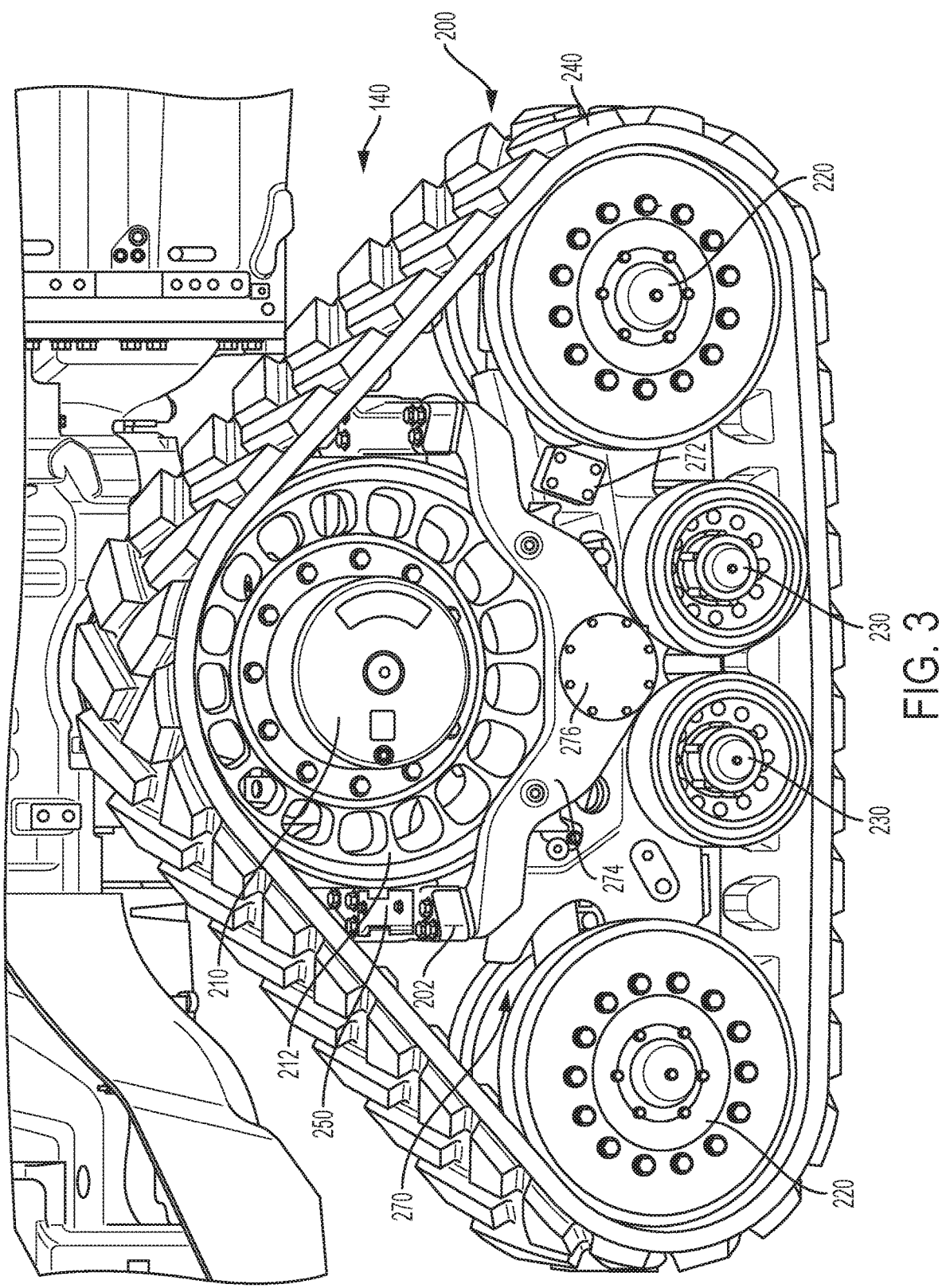
FIG. 3 illustrates a straight outside view of the first exemplary track drive assembly attached to the first exemplary axle assembly.
Figure 4:
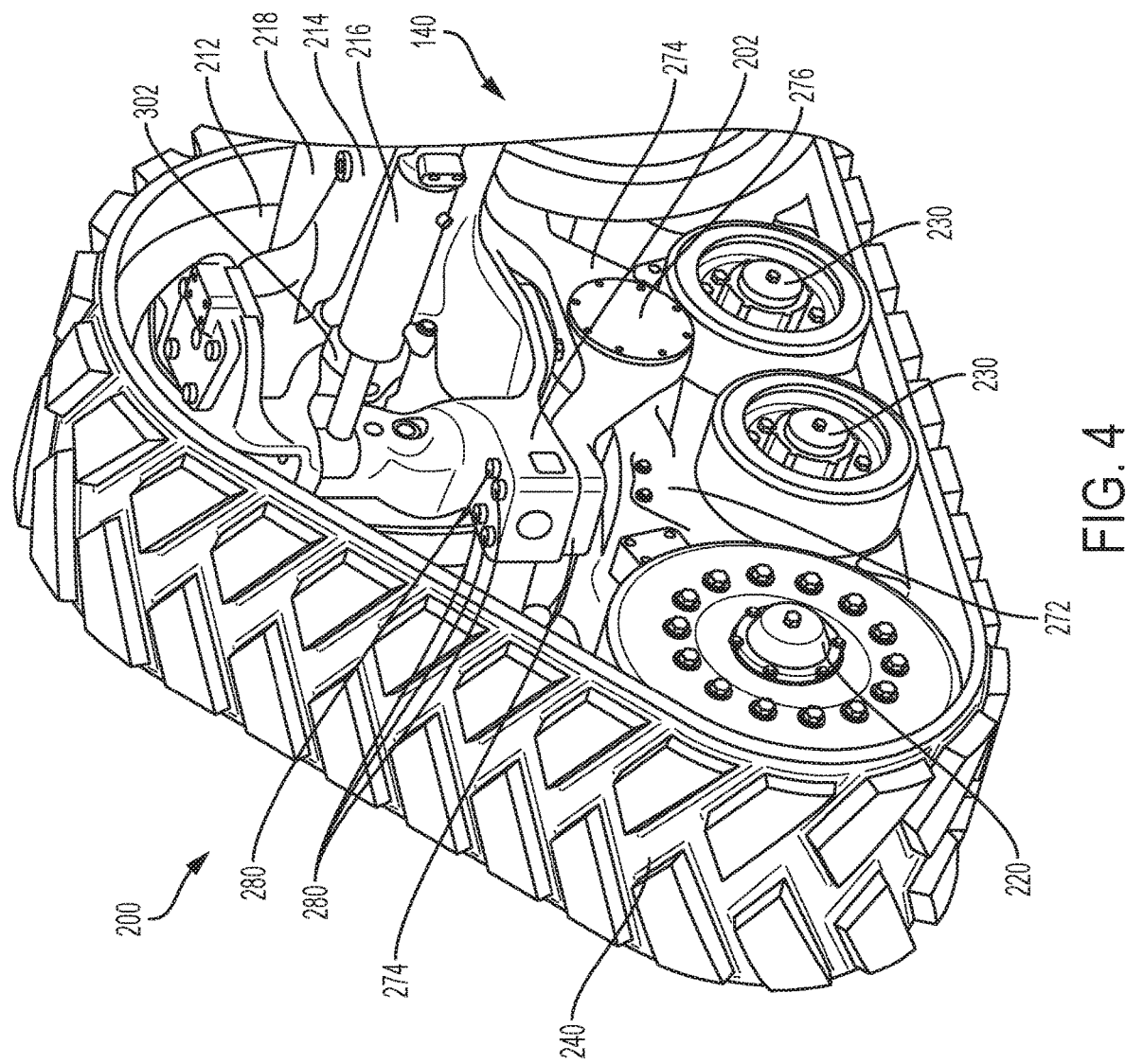
FIG. 4 illustrates an inside view of the first exemplary track drive assembly attached to the first exemplary axle assembly.

FIG. 2 illustrates an angled outside view, FIG. 3 illustrates a straight outside view and FIG. 4 illustrates an inside view of a first exemplary embodiment of a steerable axle assembly 140 used with an exemplary track drive assembly 200. The track drive assembly 200 includes a drive frame 270, a drive wheel 212, idlers 220, mid rollers 230, and track 240. The drive frame 270 can include an undercarriage frame 272 and a pivot support 274 with a pivot element 276, where the undercarriage frame 272 can pivot about the pivot element 276 of the pivot support 274. The axle assembly 140 includes a knuckle 202, a hub 210, a driveshaft 302, a structural housing 214, a steering cylinder 216 and a tie rod 218. The axle assembly 140 of the vehicle 100 is driven by power from the engine 120.

Power is transferred to the hub 210 from the driveshaft 302 which extends through the knuckle 202 and the structural housing 214 to power the axle assembly 140. The hub 210 can be mechanically coupled to the driveshaft 302 using a gear set and can be mechanically coupled to the knuckle 202 using a bearing set. The steering cylinder 216 is coupled to the knuckle 202 and the structural axle housing 214. The steering cylinder can rotate the knuckle 202 about a steering axis to control the orientation of the knuckle 202 and hub 210 to the tractor frame 102 to steer the vehicle 100 left or right. The pivot support 274 of the drive frame 270 is connected to the knuckle 202, and will turn the track assembly 200 in the direction that the knuckle 202 is oriented. The idlers 220 and mid rollers 230 are connected to the undercarriage frame 272 of the drive frame 270 which pivots about the pivot element 276 of the pivot support 274 to follow the contour of the ground. The track 240 moves about the drive wheel 212, idlers 220 and mid rollers 230. The knuckle 202 and drive frame 270 support the components of the track drive assembly 200. The drive wheel 212 is coupled to the hub 210, rotates with the hub 210 and will be oriented in the same direction as the hub 210. A scraper 250 is shown in FIG. 3, which can scrape dirt and debris from the drive wheel 212 as it rotates. The drive wheel 212 drives the track 240 clockwise or counterclockwise around the drive wheel 210, idlers 220 and mid rollers 230 to propel the vehicle 100.

Figure 5:
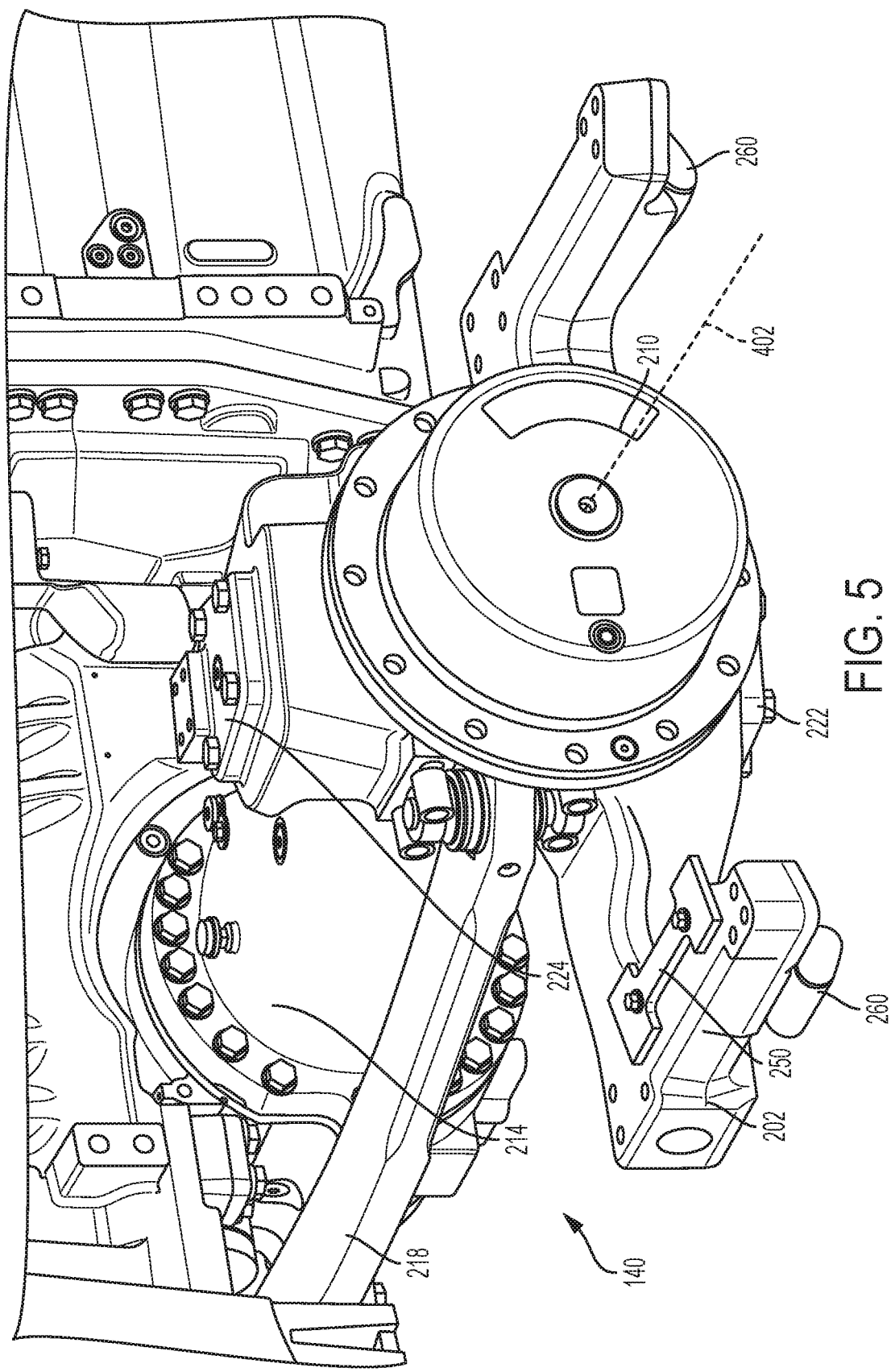
FIG. 5 illustrates an outside view of the first exemplary axle assembly without a track assembly.
Figure 6:
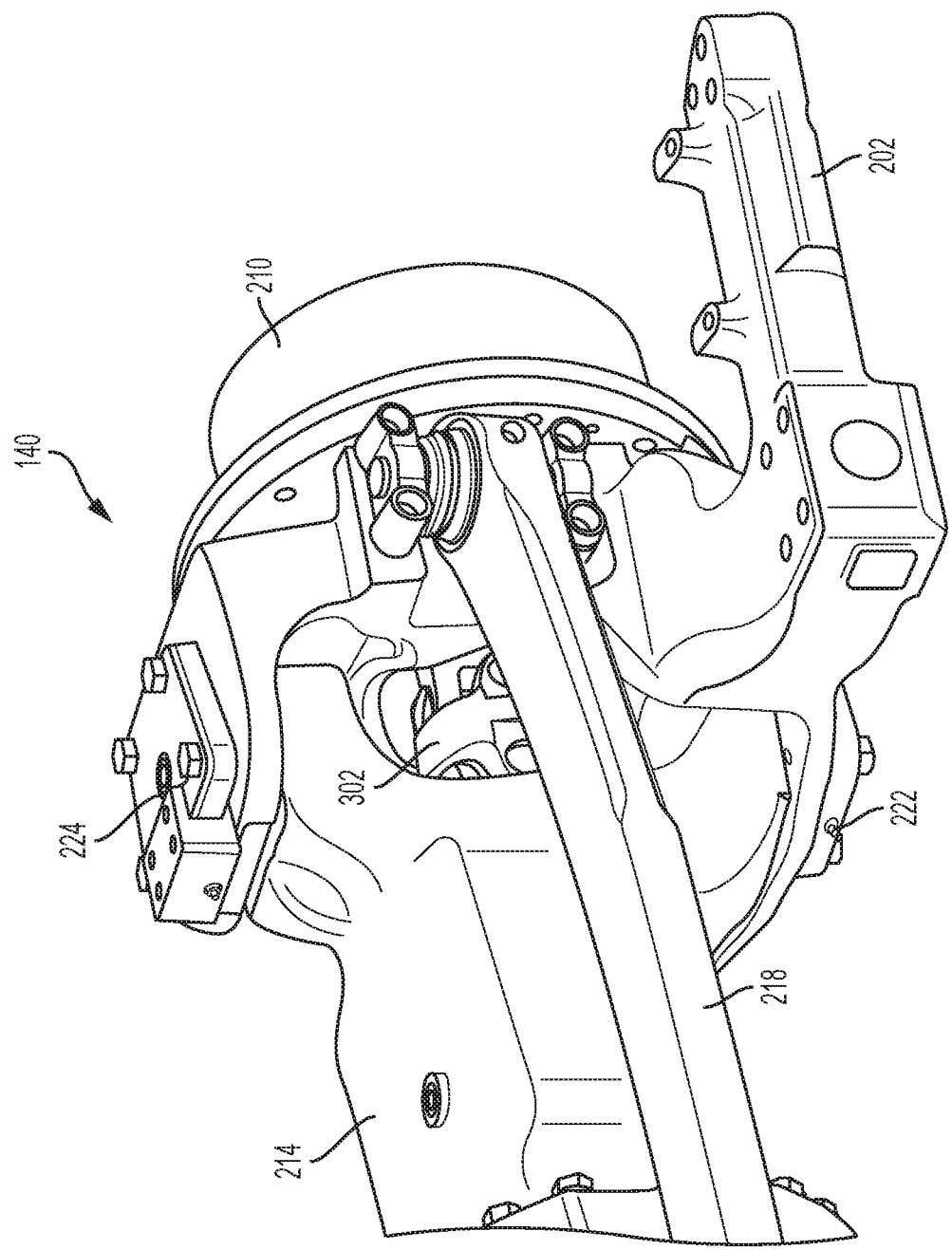
FIG. 6 illustrates an inside view of the first exemplary axle assembly without a track assembly.

FIG. 5 illustrates an outside view and FIG. 6 illustrates an inside view of an exemplary axle assembly 140 without a track assembly. FIGS. 5 and 6 show the knuckle 202, the hub 210, the structural housing 214, an upper king pin 224, a lower king pin 222, a tie rod 218, the driveshaft 302 and a rotational axis 402 about which the driveshaft 302 rotates. FIG. 5 also shows the scraper 250 and oscillation stops 260 connected to the knuckle 202. The oscillation stops prevent the undercarriage frame 272 from over traveling while pivoting about the pivot element 276 of the pivot support 274.

Figure 7:
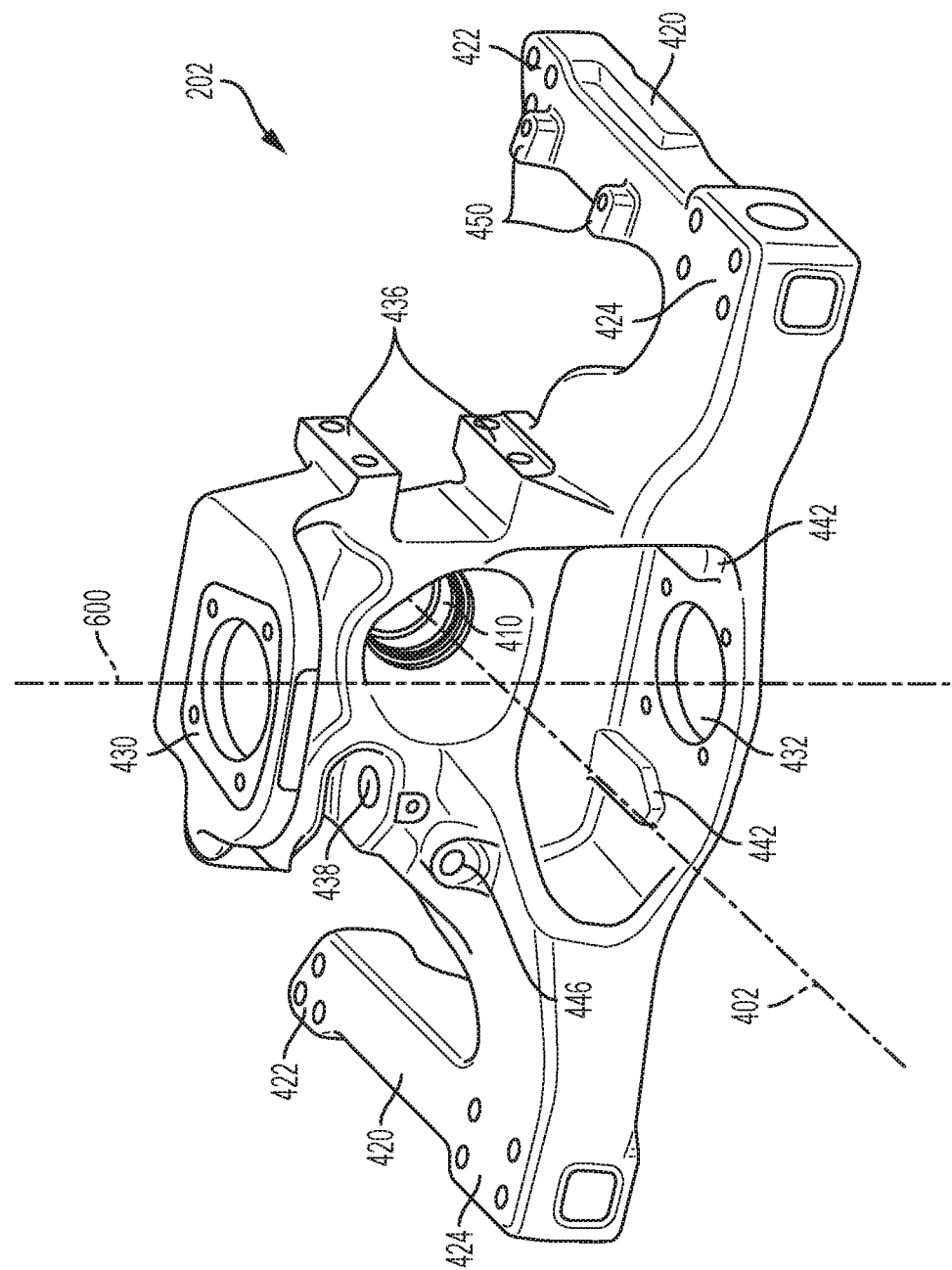
FIG. 7 illustrates an inside view of a first exemplary embodiment of a steerable knuckle.
Figure 8:
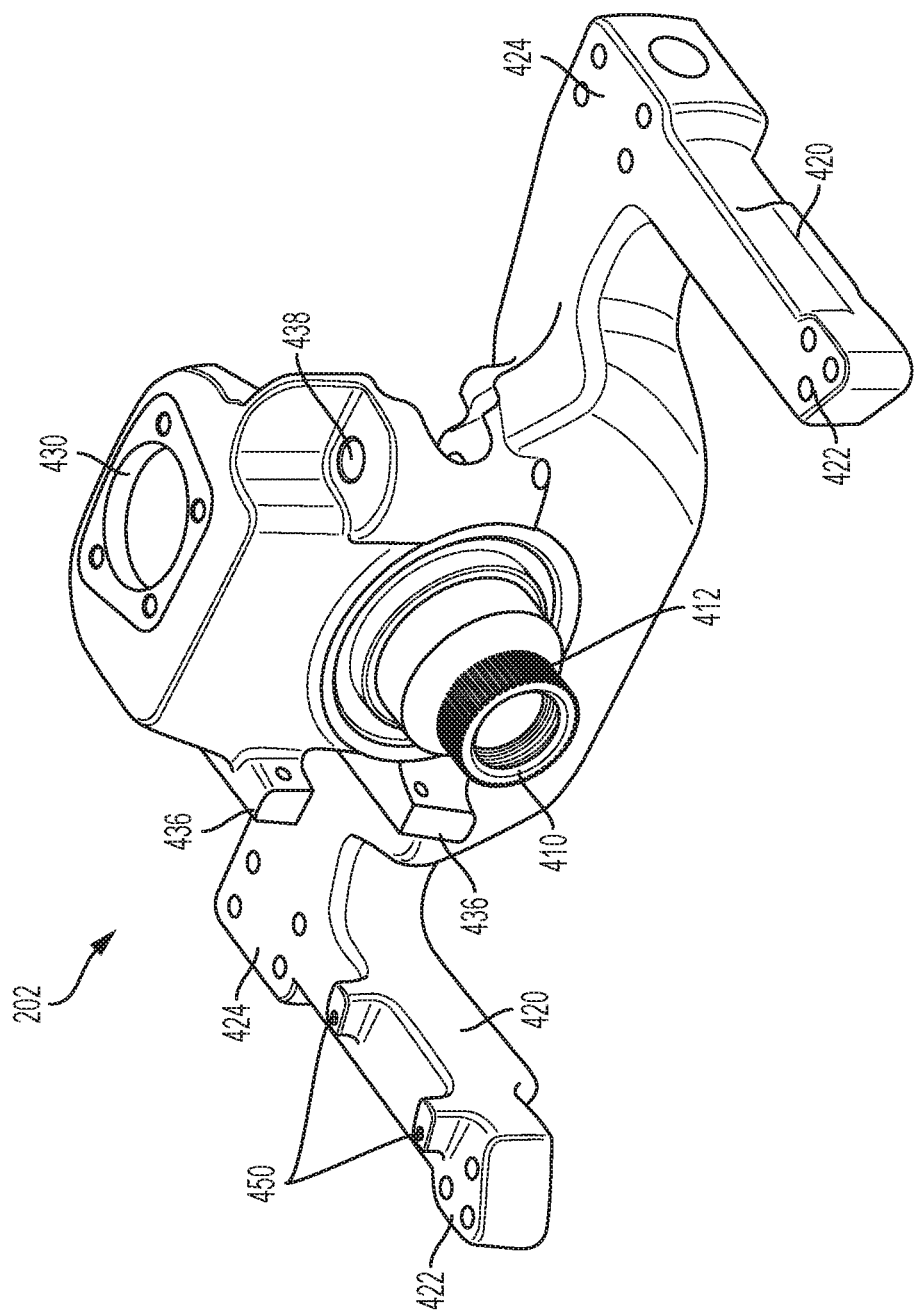
FIG. 8 illustrates an outside view of the first exemplary embodiment of the steerable knuckle.
Figure 9:
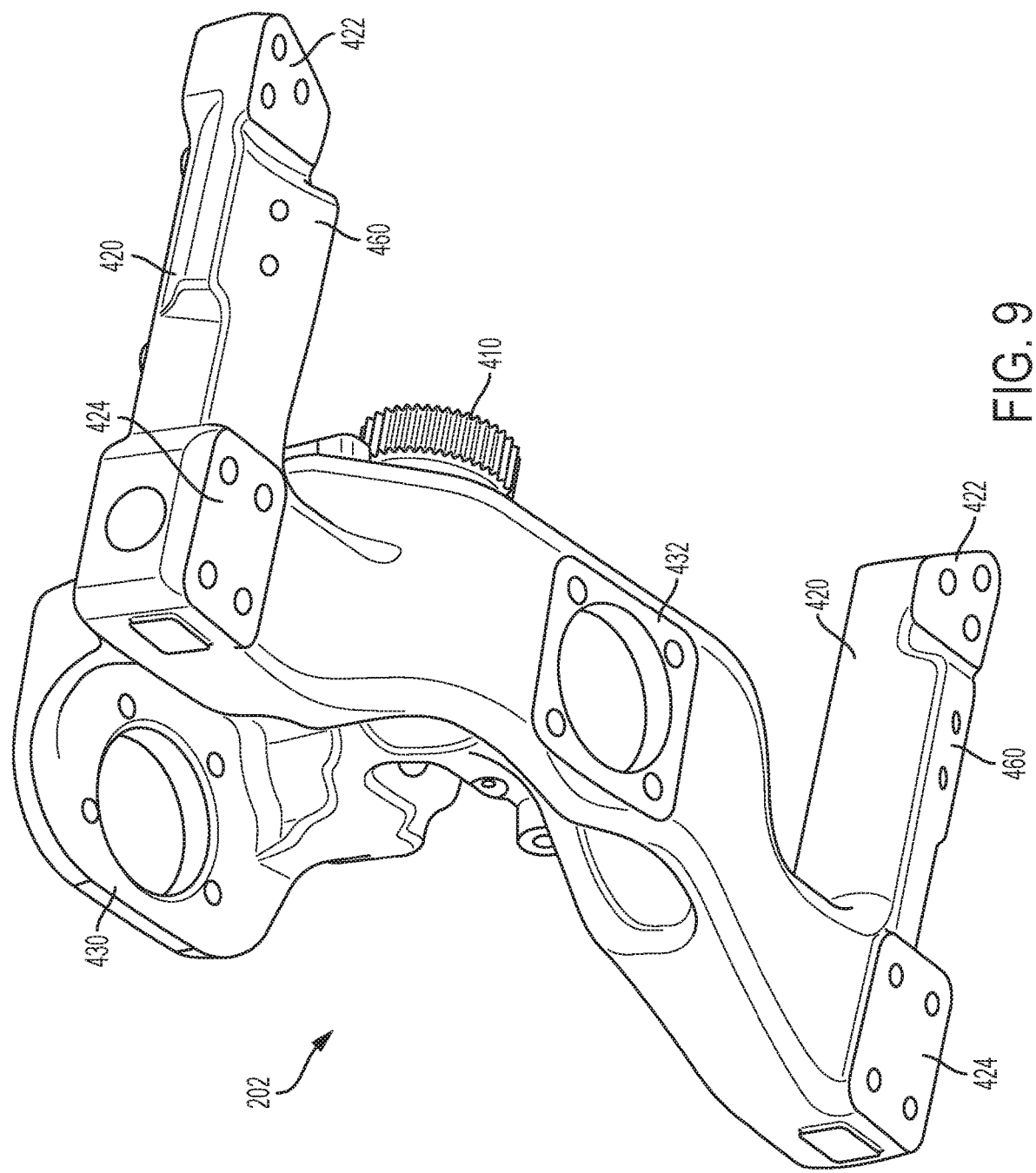
FIG. 9 illustrates an underside view of the first exemplary embodiment of the steerable knuckle.

FIG. 7 illustrates an inside view, FIG. 8 illustrates an outside view and FIG. 9 illustrates an underside view of an exemplary embodiment of the knuckle 202. The exemplary knuckle 202 is a single piece integrated knuckle that can be used on a powered steerable axle for use with tracks. The knuckle 202 includes a hollow spindle 410, integrated undercarriage support arms 420, an upper king pin connection 430, a lower king pin connection 432, tie rod connection 436, and steering cylinder connection 438. Each integrated undercarriage support arms 420 of the knuckle 202 includes an outboard track frame mount 422 and an inboard track frame mount 424 for connection of the knuckle 202 to the pivot support 274 of the drive frame 270 of the track drive assembly 200. The outboard and inboard track frame mounts 422, 424 on each undercarriage support arm 420 are generally horizontal, so that fasteners 280 (see FIGS. 2 and 4) can be installed generally vertically at the outboard and inboard track frame mounts 422, 424 to connect the pivot support 274 of the drive frame 270 of the track drive assembly 200. The knuckle 202 can also include adjustable steering stops 446 and/or non-adjustable steering stops 442, and the spindle 410 can include axially extending splines 412 on its outer surface. The undercarriage support arms 420 of the knuckle 202 can also include a scraper mount 450 and/or oscillation stop mounts 460.

The driveshaft 302 passes through the hollow spindle 410 and is coupled to the hub 210 and drive wheel 212. Rotation of the driveshaft 302 about the rotational axis 402 provides rotational power to the wheel hub 210 and drive wheel 212 to drive the track 240 and vehicle 100 forward and backward. The spindle 410 provides support to wheel hub bearings, a final drive gear set and the wheel hub 210, on which the track drive wheel 212 is mounted. The track tension applied to the drive wheel 212 is reacted through the spindle 410.

The knuckle 202 can pivot about a steering axis 600 that passes through the upper king pin connection 430 and the lower king pin connection 432. The steering axis 600 that passes through the upper and lower king pin connections 430, 432 can include some offsets that may cause the steering axis 600 to range up to 9 degrees from perpendicular with the rotational axis 402, which will be referred to as generally perpendicular. A steering cylinder 216 connected to the knuckle 202 at the steering cylinder connection 438 can control the pivoting of the knuckle 202 about the steering axis 600. A tie rod 218 connected to the knuckle 202 at the tie rod connection 436 can control the orientation of the corresponding left and right knuckles 202 on opposite sides of the axle assembly, so that they steer in the same general direction. The left and right knuckles 202 being on opposite sides of the vehicle 100, for example the left and right knuckles connected to opposite ends of a front axle assembly or a rear axle assembly of the vehicle 100. The steering stops 442, 446 can define limits for pivoting of the knuckle 202 about the steering axis 600. This pivoting of the knuckle 202 about the steering axis 600 enables steering of the track assemblies 200 to steer the vehicle 100 to the left or right.

The integrated undercarriage support arms 420 include outboard track frame mount 422 and inboard track frame mount 424 for mounting the track drive assembly 200. The track tension as well as undercarriage vertical, fore/aft and lateral loads are reacted through the support arms 420. One or both of the undercarriage support arms 420 can include the scraper mount 450 where a scraper 250 can be mounted to scrape dirt and debris from the drive wheel 212 as it rotates. The undercarriage support arms 420 can also include the oscillation stop mounts 460 where oscillation stops 260 can be mounted. The oscillation stops 260 can be made of rubber or other durable relatively shock absorbing material, so that when the undercarriage frame 272 of the track drive assembly 200 oscillates about the pivot element 276 of the pivot support 274 due to the terrain, the undercarriage frame 272 bumps against the shock absorbing oscillation stops 260 instead of the hard metal of the support arms 420 of the knuckle 202.

Figure 10:
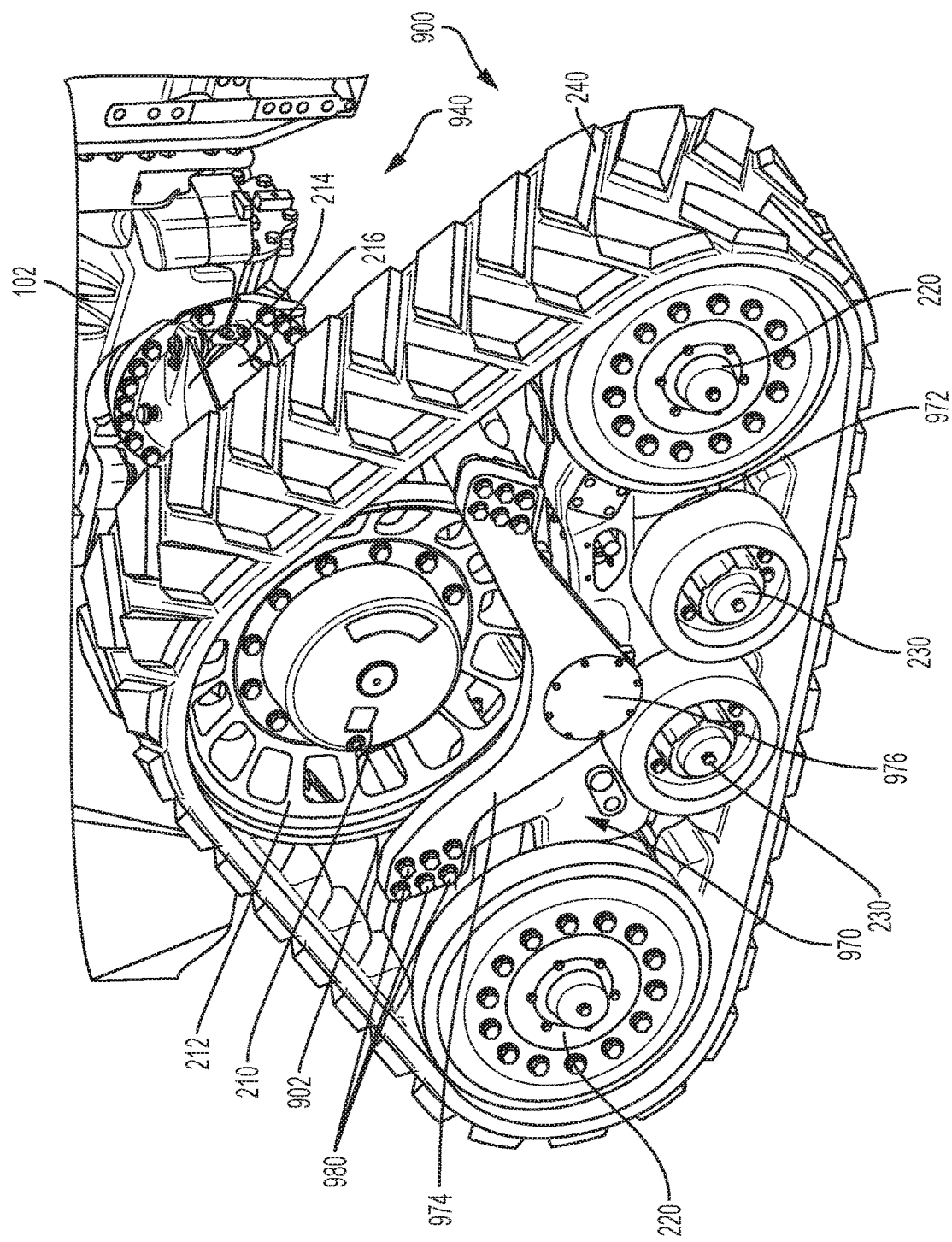
FIG. 10 illustrates an angled outside view of a second exemplary track drive assembly attached to a second exemplary axle assembly.
Figure 11:
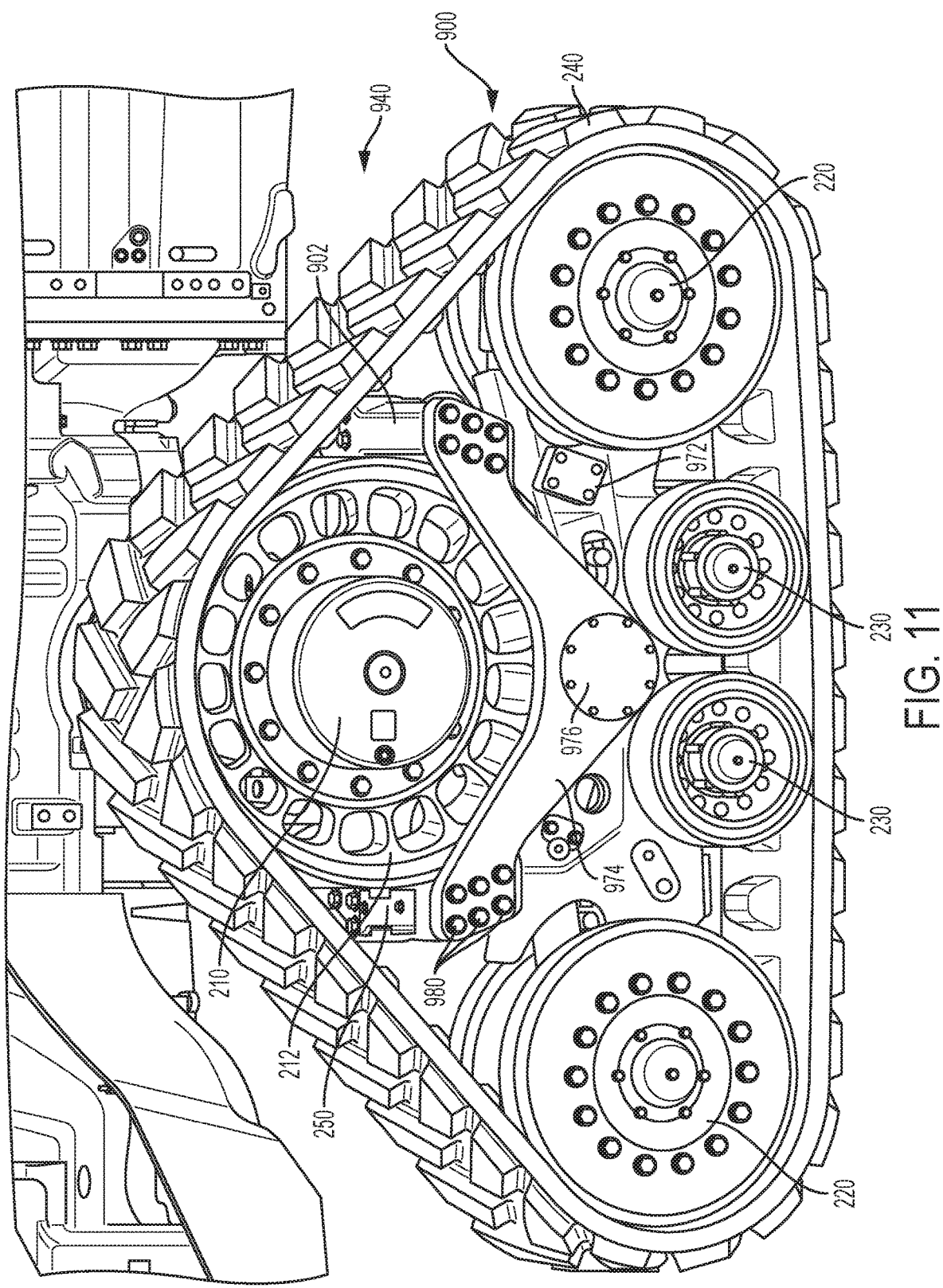
FIG. 11 illustrates a straight outside view of the second exemplary track drive assembly attached to the second exemplary axle assembly.
Figure 12:
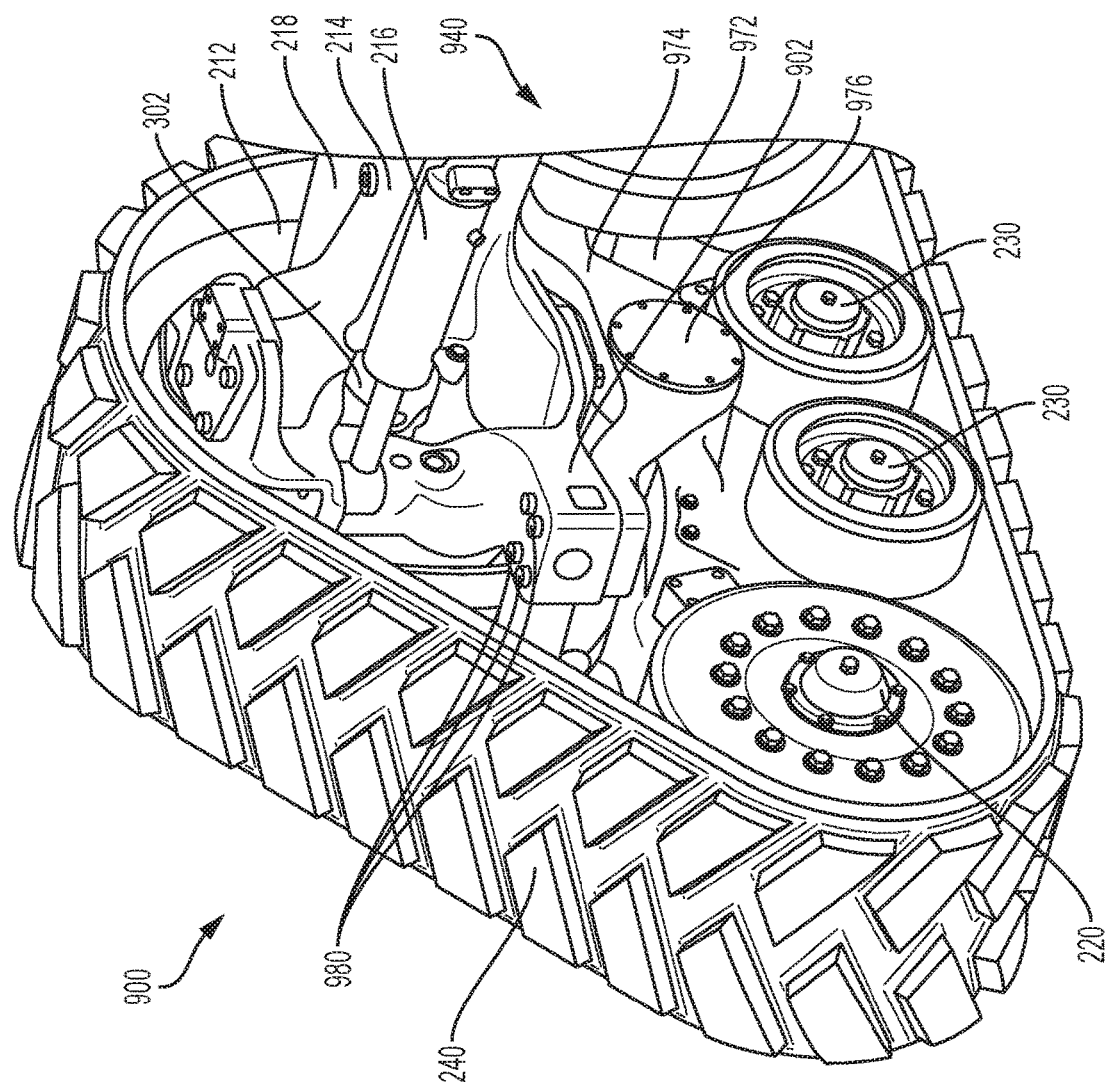
FIG. 12 illustrates an inside view of the first exemplary track drive assembly attached to the first exemplary axle assembly.

FIG. 10 illustrates an angled outside view, FIG. 11 illustrates a straight outside view and FIG. 12 illustrates an inside view of a second exemplary embodiment of a steerable axle assembly 940 used with a second exemplary track drive assembly 900. The track drive assembly 900 includes a drive frame 970, a drive wheel 212, idlers 220, mid rollers 230, and track 240. The drive frame 970 can include an undercarriage frame 972 and a pivot support 974 with a pivot element 976, where the undercarriage frame 972 can pivot about the pivot element 976 of the pivot support 974. The axle assembly 940 includes a knuckle 902, a hub 210, a driveshaft 302, a structural housing 214, a steering cylinder 216 and a tie rod 218. The axle assembly 940 of the vehicle 100 is driven by power from the engine 120.

The steerable axle assembly 940 and the track drive assembly 900 are very similar to the steerable axle assembly 140 and the track drive assembly 200 described above except for differences in the connections between the two assemblies as will be explained below. The drive, steering, rotation and other functionality described above for the steerable axle assembly 140 and the track drive assembly 200 also applies to the steerable axle assembly 940 and the track drive assembly 900.

Figure 13:
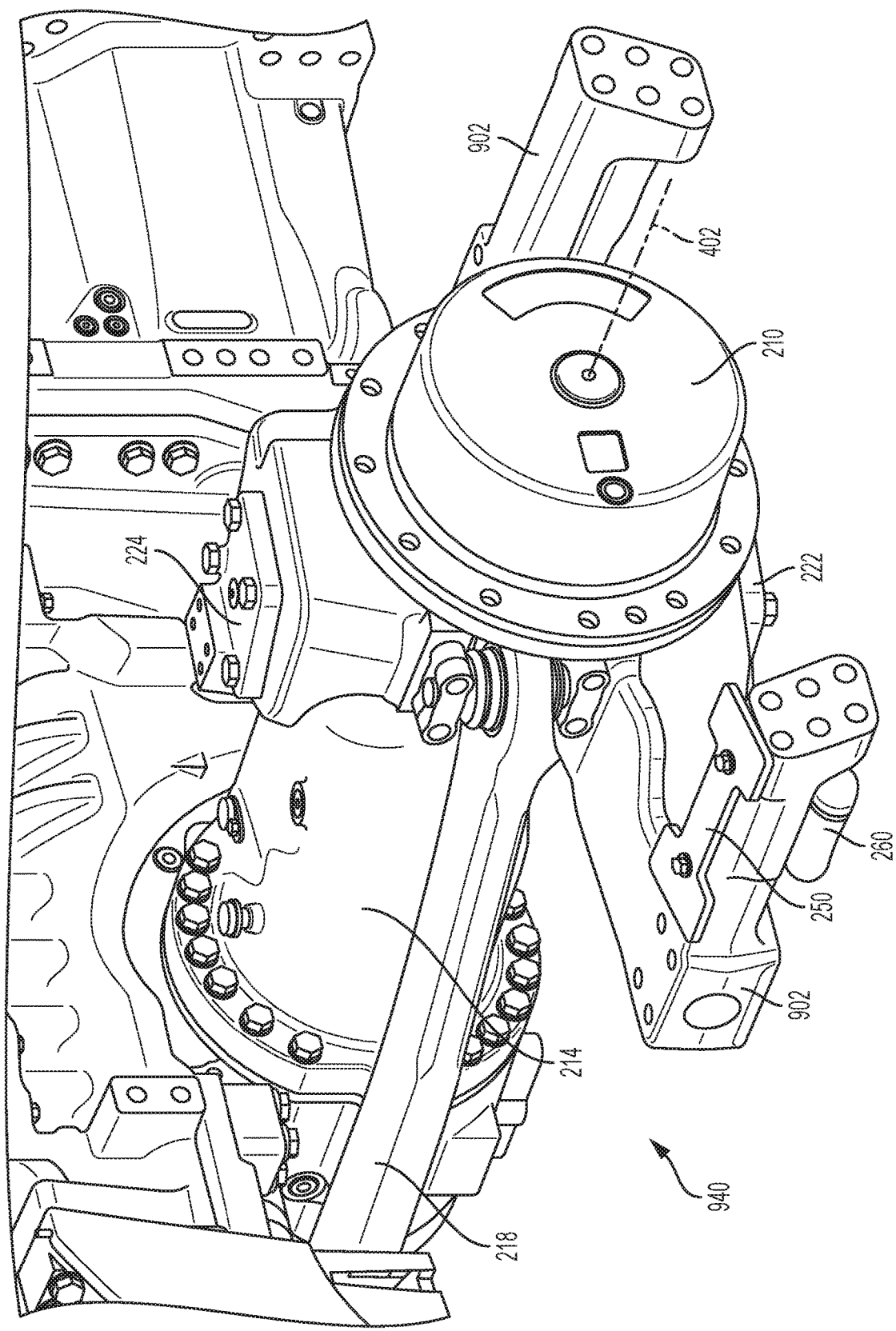
FIG. 13 illustrates an outside view of the second exemplary axle assembly without a track assembly.
Figure 14:
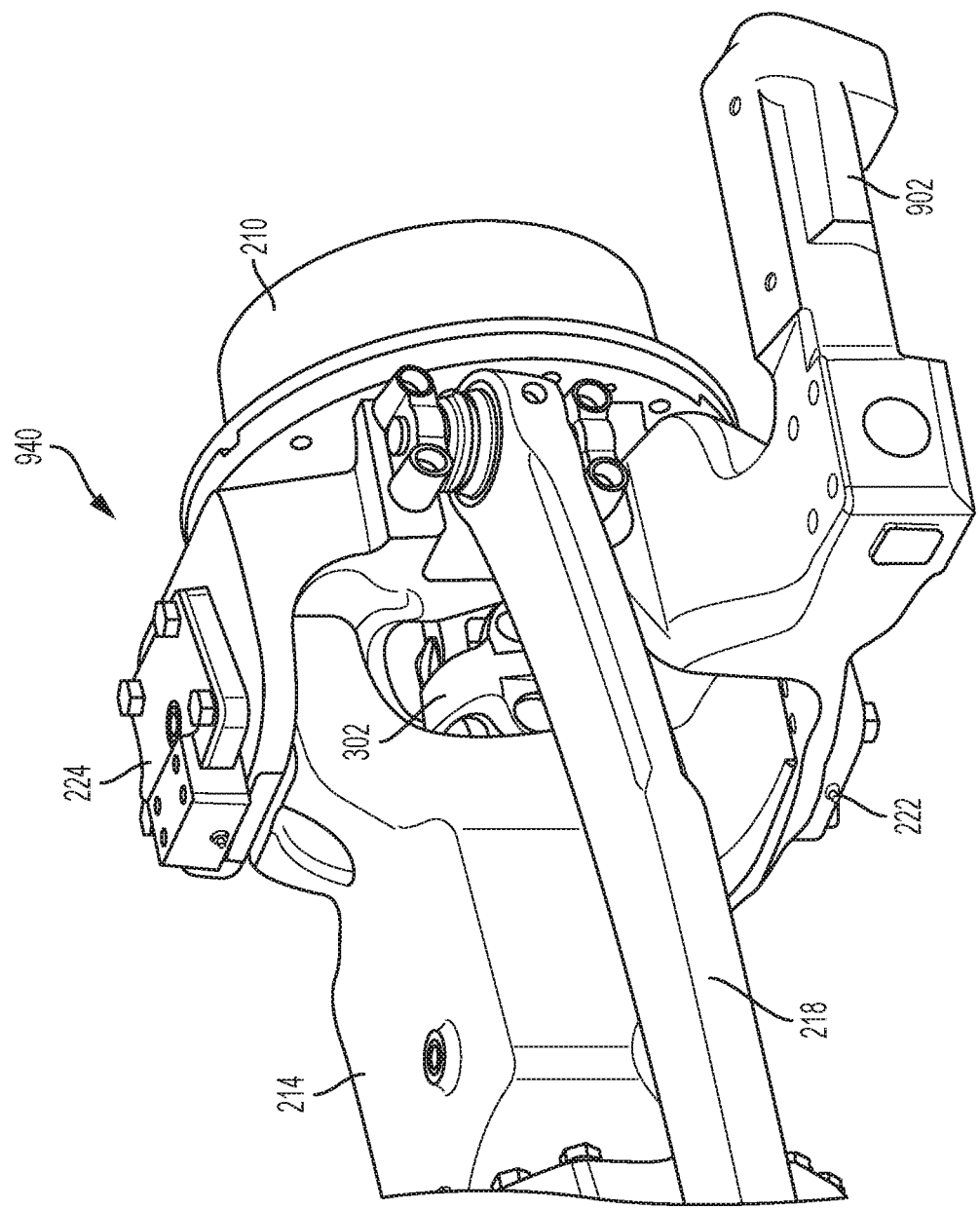
FIG. 14 illustrates an inside view of the second exemplary axle assembly without a track assembly.

FIG. 13 illustrates an outside view and FIG. 14 illustrates an inside view of the exemplary axle assembly 940 without a track assembly. FIGS. 13 and 14 show the knuckle 902, the hub 210, the structural housing 214, an upper king pin 224, a lower king pin 222, a tie rod 218, the driveshaft 302 and a rotational axis 402 about which the driveshaft 302 rotates. FIG. 13 also shows the scraper 250 and oscillation stops 260 connected to the knuckle 902.

Figure 15:
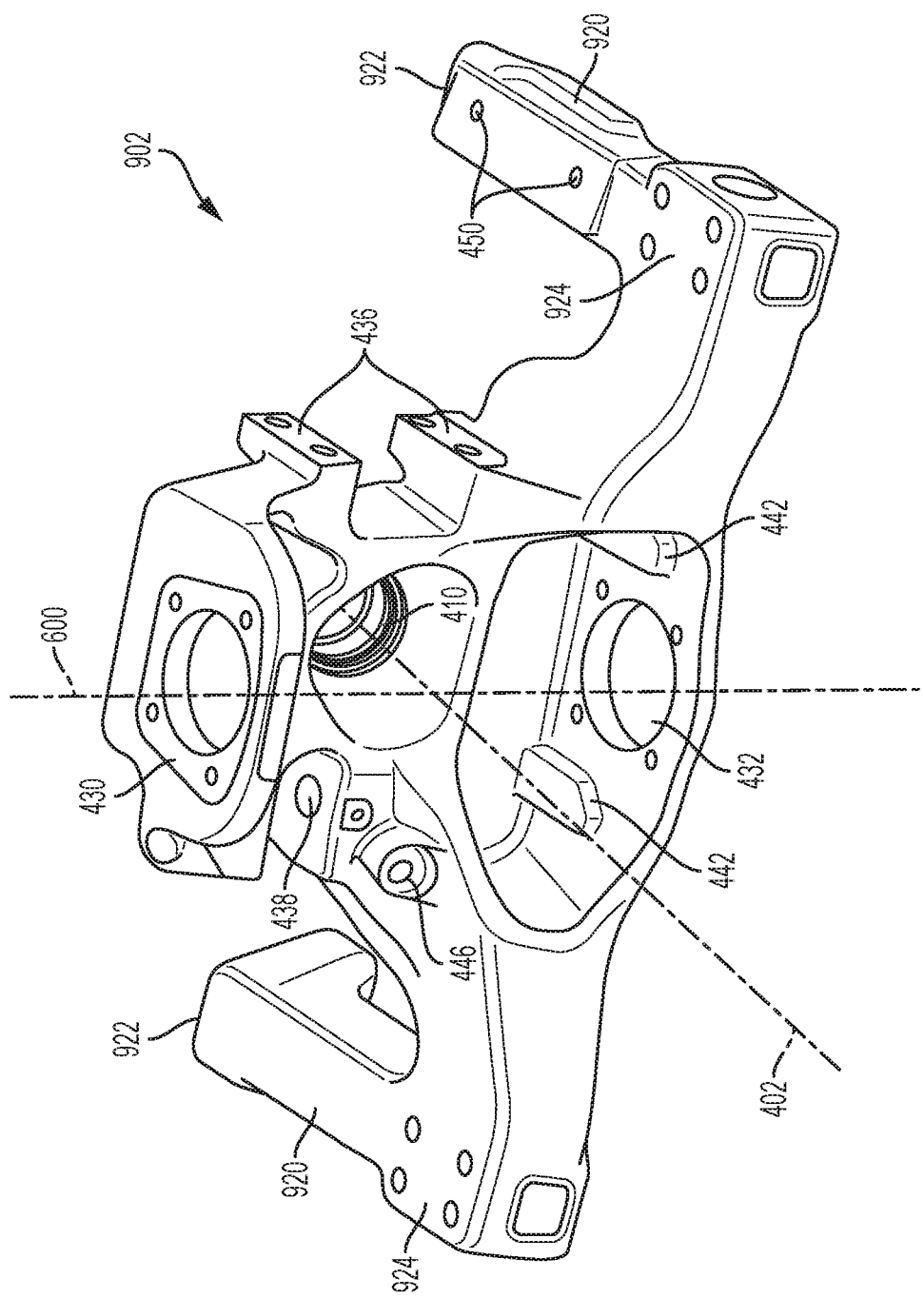
FIG. 15 illustrates an inside view of a second exemplary embodiment of a steerable knuckle.
Figure 16:
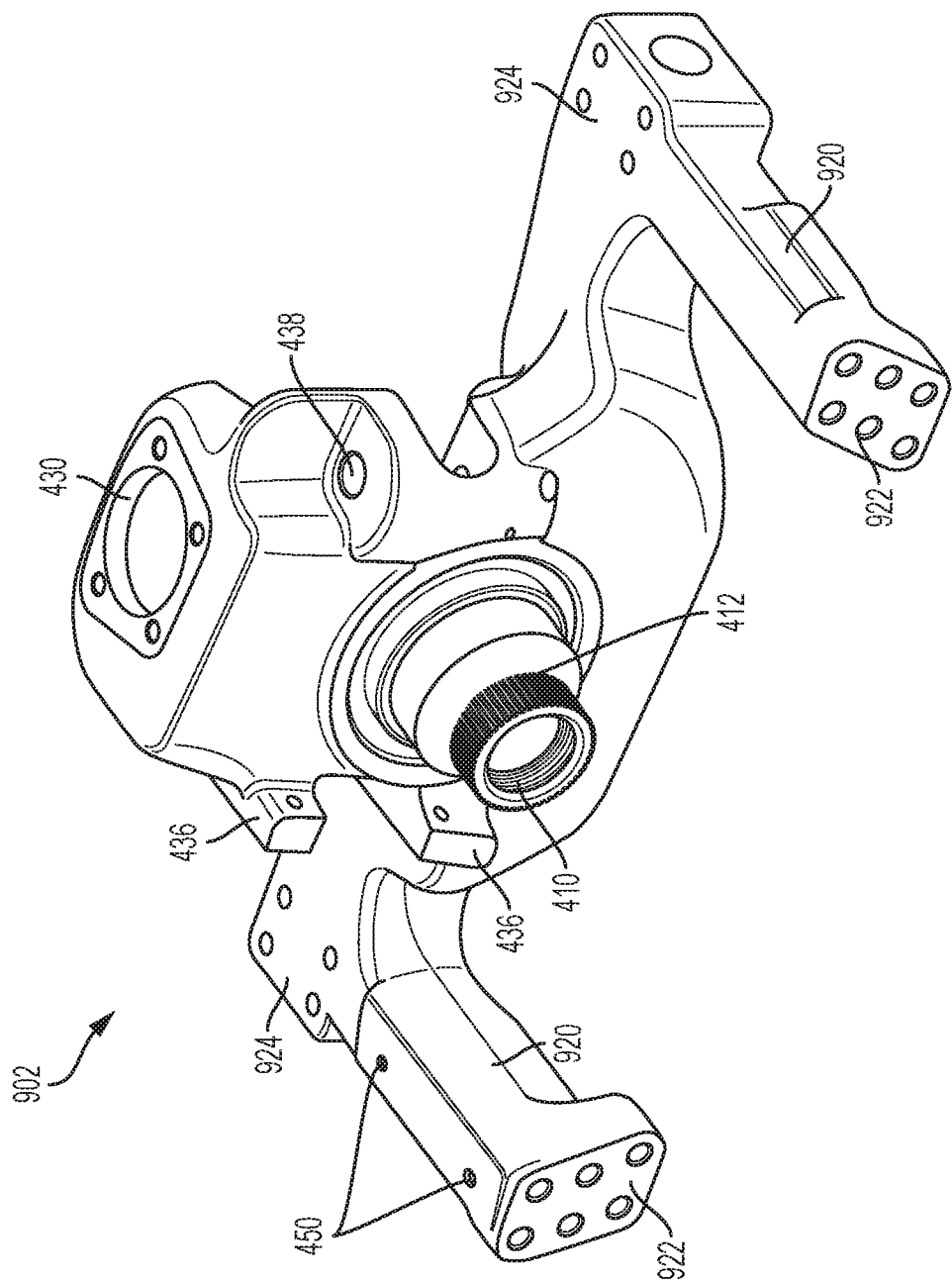
FIG. 16 illustrates an outside view of the second exemplary embodiment of the steerable knuckle.
Figure 17:
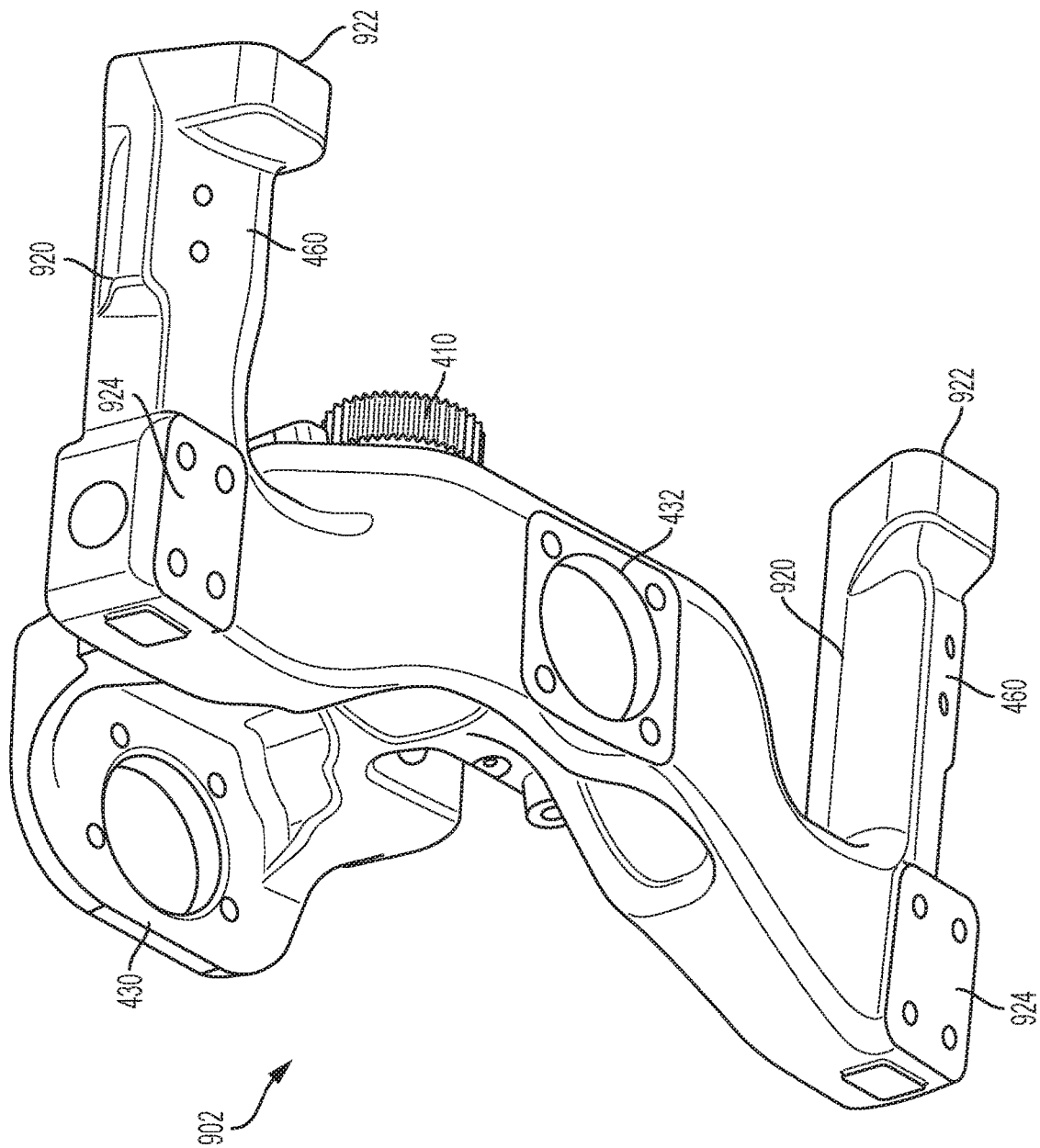
FIG. 17 illustrates an underside view of the second exemplary embodiment of the steerable knuckle.

FIG. 15 illustrates an inside view, FIG. 16 illustrates an outside view and FIG. 17 illustrates an underside view of an exemplary embodiment of the knuckle 902. The exemplary knuckle 902 is a single piece integrated knuckle that can be used on a powered steerable axle for use with tracks. The knuckle 902 includes a hollow spindle 410, integrated undercarriage support arms 920, an upper king pin connection 430, a lower king pin connection 432, tie rod connection 436, and steering cylinder connection 438. Each integrated undercarriage support arms 920 of the knuckle 902 includes an outboard track frame mount 922 and an inboard track frame mount 924 for connection of the knuckle 902 to the drive frame 970 of the track drive assembly 900. The outboard track frame mounts 922 are generally vertical, so that fasteners 980 (see FIGS. 10-11) can be installed generally horizontally at the outboard track frame mounts 922 to connect the drive frame 970 of the track drive assembly 900. The inboard track frame mounts 924 are generally horizontal, so that fasteners 980 (see FIG. 12) can be installed generally vertically at the inboard track frame mounts 924 to connect the drive frame 970 of the track drive assembly 900. The knuckle 902 can also include adjustable steering stops 446 and/or non-adjustable steering stops 442, and the spindle 410 can include axially extending splines 412 on its outer surface. The undercarriage support arms 920 of the knuckle 902 can also include a scraper mount 450 and/or oscillation stop mounts 460.

The relationships and functionality of the components of the steerable axle assembly 940, the track drive assembly 900 and the knuckle 902 are as described above for the steerable axle assembly 140, the track drive assembly 200 and knuckle 202 except for differences in the connection between the knuckle 202 and the track drive assembly 200, and the connection between the knuckle 902 and the track drive assembly 900 as will be explained below.

The integrated undercarriage support arms 920 include outboard track frame mount 922 and inboard track frame mount 924 for mounting the track drive assembly 200. The track tension as well as undercarriage vertical, fore/aft and lateral loads are reacted through the support arms 920. One or both of the undercarriage support arms 920 can include the scraper mount 450 where a scraper 250 can be mounted to scrape dirt and debris from the drive wheel 212 as it rotates. The undercarriage support arms 920 can also include the oscillation stop mounts 460 where oscillation stops 260 can be mounted. The oscillation stops 260 can be made of rubber or other durable relatively shock absorbing material, so that when the undercarriage frame 972 of the track drive assembly 900 oscillates about the pivot element 976 of the pivot support 974 due to the terrain, the undercarriage frame 972 bumps against the shock absorbing oscillation stops 260 instead of the hard metal of the support arms 920 of the knuckle 902.

The primary differences between the knuckle 902 of FIGS. 10-17 and the knuckle 202 of FIGS. 2-9 are in the configuration of the outboard track frame mounts. The knuckle 202 has generally horizontal outboard track frame mounts 422 on each of the undercarriage support arms 420, so that fasteners 280 can be installed generally vertically at the outboard track frame mounts 422 to connect the pivot support 274 of the drive frame 270 of the track drive assembly 200. Whereas, the knuckle 902 has generally vertical outboard track frame mounts 922 on each of the undercarriage support arms 920, so that fasteners 980 can be installed generally horizontally at the outboard track frame mounts 922 to connect the pivot support 974 of the drive frame 970 of the track drive assembly 900. The inboard track frame mounts 424 of the knuckle 202 and the inboard track frame mounts 924 of the knuckle 902 are generally horizontal on each of the undercarriage support arms 420, 920, so that fasteners can be installed generally vertically at the inboard track frame mounts 424, 924 to connect the pivot support 274, 974 of the drive frame 270, 970 of the appropriate track drive assembly 200, 900. The inboard and outboard pivot mounts can have other orientations besides the generally vertical and horizontal orientations shown in the two exemplary embodiments, and a single pivot mount can have fastener locations with different orientations. The fasteners 280, 980 can be bolts, screws, clips or other types of fasteners.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. An axle and track drive assembly for a vehicle that is powered and steerable; the axle and track drive assembly comprising:
    a driveshaft that is rotatable in the forward and reverse directions about a rotational axis;
    a steerable knuckle with first and second undercarriage support arms, where the first undercarriage support arm has an inboard track frame mount and an outboard track frame mount and the second undercarriage support arm has an inboard track frame mount and an outboard track frame mount, where the steerable knuckle is pivotable about a steering axis that is generally perpendicular to the rotational axis, and where the driveshaft extends through the knuckle;
    a hub mechanically coupled to the driveshaft;
    a drive wheel coupled to the hub;
    a track drive frame comprising an undercarriage frame and a pivot support coupled by a pivot element, where the undercarriage frame pivots about the pivot element relative to the pivot support, and where the inboard and outboard track frame mounts of the first undercarriage support arm are connected to the pivot support on one side of the pivot element and the inboard and outboard track frame mounts of the second undercarriage support arm are connected to the pivot support on an opposite side of the pivot element;
    a plurality of rollers coupled to the track drive frame;
    a track connected to the drive wheel and the plurality of rollers;
    wherein rotation of the driveshaft about the rotational axis rotates the hub and drive wheel which rotates the track about the drive wheel and the plurality of rollers, and movement of the steerable knuckle about the steering axis turns the track drive frame; and
    wherein when the undercarriage frame on one side of the pivot element pivots down relative to the first undercarriage support arm then the undercarriage frame on the opposite side of the pivot element pivots up relative to the second undercarriage support arm, and when the undercarriage frame on the opposite side of the pivot element pivots down relative to the second undercarriage support arm then the undercarriage frame on the one side of the pivot element pivots up relative to the first undercarriage support arm; and
    wherein the outboard track frame mounts of the first and second undercarriage support arms are generally horizontal, so that fasteners are installed generally vertically at the outboard track frame mounts to connect the pivot support of the track drive frame to the first and second undercarriage support arms.

2. The axle and track drive assembly of claim 1, wherein the steerable knuckle includes a hollow spindle, and the driveshaft extends through the hollow spindle.

3. The axle and track drive assembly of claim 1, wherein the inboard track frame mounts of the first and second undercarriage support arms are generally horizontal, so that fasteners are installed generally vertically at the inboard track frame mounts to connect the pivot support of the track drive frame to the first and second undercarriage support arms.

4. The axle and track drive assembly of claim 1, further comprising a structural axle housing where the driveshaft extends through the axle housing; and
    the steerable knuckle includes a king pin connection, the knuckle is coupled to the axle housing at the king pin connection and the steering axis passes through the knuckle at the king pin connection.

5. The axle and track drive assembly of claim 4, wherein the steerable knuckle includes a steering cylinder connection, and a steering cylinder connected at the steering cylinder connection can be used to pivot the knuckle about the steering axis.

6. The axle and track drive assembly of claim 1, wherein the steerable knuckle is a single piece comprising a hollow spindle, the first and second undercarriage support arms, a king pin connection, a steering cylinder connection, a tie rod connection and a steering stop;
    wherein the driveshaft extends through the hollow spindle, the track drive frame is connected to the first and second undercarriage support arms, the steering axis passes through the knuckle at the king pin connection, the steering stop limits how far the knuckle can pivot about the steering axis, and a steering cylinder connected at the steering cylinder connection can pivot the knuckle about the steering axis.

7. The axle and track drive assembly of claim 1, wherein the steerable knuckle further comprises a scraper mount, such that a scraper connected at the scraper mount scrapes debris from the drive wheel.

8. The axle and track drive assembly of claim 1, wherein the steerable knuckle further comprises a first oscillation stop mount on the first undercarriage support arm and a second oscillation stop mount on the second undercarriage support arm, such that a first oscillation stop connected at the first oscillation stop mount prevents the track drive frame from over traveling when the pivot support pivots about the pivot element in a first direction and a second oscillation stop connected at the second oscillation stop mount prevents the track drive frame from over traveling when the pivot support pivots about the pivot element in a second direction, where the second direction is opposite of the first direction.

9. A steerable knuckle for an axle assembly of a vehicle that is powered and steerable to be used with a track drive assembly; the steerable knuckle comprising:
a hollow spindle where a driveshaft of the vehicle extends through the hollow spindle, the driveshaft is rotatable in the forward and reverse directions about a rotational axis;
first and second undercarriage support arms, where the first undercarriage support arm includes a first inboard track frame mount and a first outboard track frame mount, and the second undercarriage support arm includes a second inboard track frame mount and a second outboard track frame mount, and where the track drive assembly is connected to the first undercarriage support arm at the first inboard and outboard track frame mounts and is connected to the second undercarriage support arm at the second inboard and outboard track frame mounts; and
a steering axis that passes through the knuckle and is generally perpendicular to the rotational axis, where the steerable knuckle is pivotable about the steering axis;
wherein rotation of the driveshaft of the vehicle about the rotational axis rotates a track of the track drive assembly, and rotation of the steerable knuckle about the steering axis turns the track drive assembly;
wherein the steerable knuckle is a single piece comprising the hollow spindle and the first and second undercarriage support arms; and
wherein the first and second outboard track frame mounts are generally horizontal, so that fasteners are installed generally vertically at the first and second outboard track frame mounts to connect the track drive assembly to the first and second undercarriage support arms.

10. The steerable knuckle of claim 9, further comprising a king pin connection, and the steering axis passes through the knuckle at the king pin connection;
and wherein the steerable knuckle is a single piece comprising the hollow spindle, the first and second undercarriage support arms and the king pin connection.

11. The steerable knuckle of claim 10, wherein the king-pin connection comprises:
an upper king pin connection; and
a lower king pin connection;
wherein the steering axis passes through the upper and lower king pin connections.

12. The steerable knuckle of claim 10, further comprising a steering cylinder connection, a tie rod connection and a steering stop;
wherein a steering cylinder connected at the steering cylinder connection can be used to pivot the knuckle about the steering axis, a tie rod of the vehicle can be coupled to the tie rod connection, and the steering stop limits how far the knuckle can pivot about the steering axis; and
wherein the steerable knuckle is a single piece comprising the hollow spindle, the first and second undercarriage support arms, the king pin connection, the steering cylinder connection, the tie rod connection and the steering stop.

13. The steerable knuckle of claim 9, wherein the first and second inboard track frame mounts are generally horizontal, so that fasteners can be installed generally vertically at the first and second inboard track frame mounts to connect the track drive assembly to the first and second undercarriage support arms.

14. The steerable knuckle of claim 9, further comprising a king pin connection, and the steering axis passes through the knuckle at the king pin connection;
and wherein the steerable knuckle is a single piece comprising the hollow spindle, the first and second undercarriage support arms and the king pin connection.

15. The steerable knuckle of claim 14, further comprising a steering cylinder connection, wherein a steering cylinder connected at the steering cylinder connection can be used to pivot the knuckle about the steering axis; and wherein the steerable knuckle is a single piece comprising the hollow spindle, the first and second undercarriage support arms, the king pin connection, and the steering cylinder connection.

16. The steerable knuckle of claim 9, further comprising a scraper mount, such that a scraper connected at the scraper mount scrapes debris from a drive wheel of the track drive assembly.

17. The steerable knuckle of claim 9, further comprising:
a first oscillation stop mount on the first undercarriage support arm; and
a second oscillation stop mount on the second undercarriage support arm;
wherein a first oscillation stop connected at the first oscillation stop mount prevents the track drive assembly from over traveling in a first direction and a second oscillation stop connected at the second oscillation stop mount prevents the track drive assembly from over traveling in a second direction, where the second direction is opposite of the first direction.

* * * * *